US006732419B2

(12) United States Patent
Davis

(10) Patent No.: US 6,732,419 B2
(45) Date of Patent: May 11, 2004

(54) METHOD FOR MANUFACTURING A PLANAR LEVER AND A CLIP

(75) Inventor: Edgar H. Davis, Calgary (CA)

(73) Assignee: Systems Investments Ltd., Calgary (CA)

( * ) Notice: Subject to any disclaimer, the term of this patent is extended or adjusted under 35 U.S.C. 154(b) by 0 days.

(21) Appl. No.: 10/285,588

(22) Filed: Nov. 1, 2002

(65) Prior Publication Data

US 2003/0084549 A1 May 8, 2003

Related U.S. Application Data

(60) Provisional application No. 60/330,996, filed on Nov. 6, 2001.

(51) Int. Cl.[7] .......... B23P 11/02

(52) U.S. Cl. .......... 29/450; 29/469; 29/243.57; 29/243.58; 24/67 R

(58) Field of Search .......... 29/450, 469, 243.56, 29/243.57, 243.58; 24/67.3, 67.5, 67 R

(56) References Cited

U.S. PATENT DOCUMENTS 3,286,381 A * 11/1966 Wooge .......... 40/641
4,532,680 A * 8/1985 Hashimoto .......... 24/67 R
4,761,862 A * 8/1988 Hiromori .......... 24/67.9
4,802,263 A * 2/1989 Lorber .......... 24/67.5
D321,209 S * 10/1991 Hiromori .......... D19/65
D321,210 S * 10/1991 Hiromori .......... D19/65
5,249,336 A * 10/1993 Miller .......... 24/67.5
5,531,047 A * 7/1996 Leopold et al. .......... 52/172
D372,498 S * 8/1996 Sato .......... D19/65
5,601,677 A * 2/1997 Leopold .......... 156/109
5,775,393 A * 7/1998 Kovacik .......... 141/383
5,975,363 A * 11/1999 Haycock .......... 222/103
6,327,749 B1 * 12/2001 Antinone .......... 24/67 R
2003/0061688 A1 * 4/2003 Rodriguez et al. .......... 24/67.5

* cited by examiner

*Primary Examiner*—Essama Omgba
(74) *Attorney, Agent, or Firm*—Bennett Jones LLP

(57) ABSTRACT

This invention discloses a method of inexpensively and reliably manufacturing a clip that has planar levers. A method for making a planar lever, which can be attached to the clamping element of a conventional binder clip, is described. Two wire members, which are bent near the end, and which each have a notched end, are inserted into a pre-formed planar member. The bend in the wire and the notched end hold the wires in place so that the lever can be attached to the clamping element. This invention also relates to a clip that has been manufactured according to the method of this invention. Finally, this invention discloses a method to make an advertising clip that can be used to hold the folded end of a collapsible tube, such as a tube of toothpaste, and a clip therefrom.

7 Claims, 4 Drawing Sheets

METHOD FOR MANUFACTURING A PLANAR LEVER AND A CLIP

The application claims the domestic priority benefit of U.S. provisional application 60/330,966, filed Nov. 6, 2001.

FIELD OF THE INVENTION

This invention relates to a method of manufacturing a clip that has planar levers for use in opening and closing the clip. Additionally, this invention relates to a clip that has been manufactured according to the method of this invention, and specifically an advertising clip that can be used to hold the folded end of a collapsible tube, such as a tube of toothpaste.

BACKGROUND OF THE INVENTION

Binder clips with a pair of opposed planar levers used for opening and closing the clip have been described in the prior art. For example, planar levers that are soft and pliable, so that use of a large number of clips will not cause pain to the fingers, or levers that are multi-coloured, allowing their use not only as a clip, but as a file or document recognition system, have been described. The prior art discloses binder clips that are modified manually, by using an element that slides over the conventional metal wire lever, or by fitting and attaching together two planar parts that sit on either side of the conventional metal wire lever. What is needed is a method of producing planar levers that is not labor intensive.

In the prior art, one of the described uses of a binder clip with a pair of opposed planar levers is to hold the folded end of a collapsible tube, such as the folded end of a tube of toothpaste. This device functions to keep the end of the tube neatly folded, so that it is easy to hold the tube, to expel the tube contents, and also so that storage in-between uses is facilitated. The prior art has also disclosed devices that function additionally to advertise a particular brand name, such as that of a toothpaste manufacturer, or to display a graphic or a message. These devices position the advertisement, graphic or message such that it is readily apparent when the user handles the tube with the device on it.

If clips with planar levers are to be used as an advertising or promotional device, they should be capable of being manufactured quickly, reliably and inexpensively, for example by a machine. The device can then be given to consumers for free, or it can be included at nominal cost in a product that a company sells. There is therefore a need in the industry for a method of machine-manufacturing a clip with planar levers, which method is reliable and produces a clip that is both durable and inexpensive to make. Optionally, this clip would be used for the purposes of advertising or promotion.

SUMMARY OF THE INVENTION

This invention provides a method of manufacturing binder clips with at least one planar lever, which method allows the clips to be made inexpensively, reliably and quickly, preferably by a machine. This invention also includes a clip comprising the aforementioned planar levers.

In one aspect, this invention is a method for manufacturing a planar lever, said method comprising:

(a) providing two wire members, each wire member comprising:
  (i) an attachment shaft, and
  (ii) a longitudinal portion with a notched end and one bend;

(b) providing one planar member, said planar member defining two cavities, with each said cavity:
  (i) defining a distal portion that hinders the rotation of the wire member about its longitudinal axis after the wire member is inserted into the cavity, and
  (ii) defining a proximal opening that permits the two wire members to be drawn together sufficiently to mount the lever onto a clamping element;
(c) inserting each wire member into one each of the cavities until the notched end reaches the distal portion; and
(d) securing each wire member within the cavity with an adhesive.

In another aspect, this invention is a method for manufacturing a clip with one planar lever, said method comprising:

(a) providing a clamping element comprising:
  (i) plated spring material formed into triangular cross-section,
  (ii) an opening along one edge, and
  (iii) two attachment cylinders on each side of the opening; and
(b) inserting each attachment shaft of a planar lever manufactured according to the method of the first aspect of this invention, into one each of the attachment cylinders located on the same side of the opening.

In another aspect, this invention is a method for manufacturing a clip with two planar levers, said method comprising inserting into the remaining two attachment cylinders of the clip with one planar lever, the attachment shafts of a second planar lever.

In another aspect, this invention is a clip comprising:

(a) a clamping element further comprising:
  (i) plated spring material formed into triangular cross-section,
  (ii) an opening along one edge, and
  (iii) two attachment cylinders on each side of the opening; and
(b) at least one planar lever manufactured according to the method of claim 1, pivotally engaged to the clamping element.

In one embodiment the adhesive is an epoxy. In one embodiment the planar member is made of plastic, and in another, metal. In one embodiment, a graphic such as an advertisement, a design or a slogan is placed on one or both sides of the planar lever.

DETAILED DESCRIPTION OF THE PRESENT INVENTION

Figure 1:
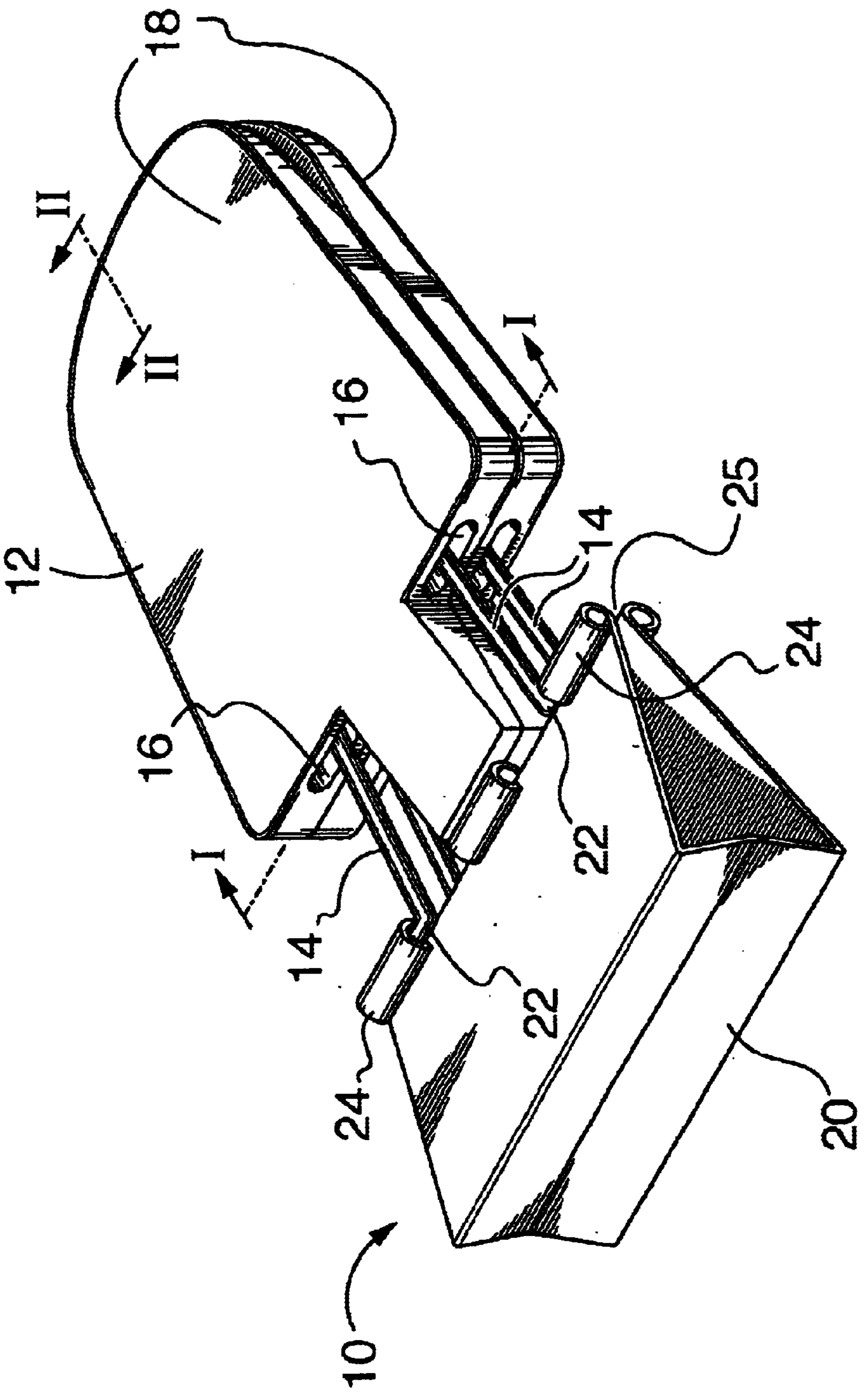
FIG. 1 is a perspective view of a clip manufactured according to the method of this invention.

FIG. 1 shows a perspective view of clip 10 manufactured according to the method of this invention, with two planar levers 12 attached to a clamping element 20. Each planar lever 12 comprises two wire members 14, and a planar member 18. The wire members 14 are each inserted into a preformed cavity 16 of the planar member 18. Each planar lever 12 is mounted onto clamping element 20 by reversibly inserting the attachment shafts 22 of the wire members into the attachment cylinders 24 on the clamping element, which are positioned on either side of an opening 25. As is appreciated, in operation the planar levers 12 are flipped back, so that they rest on either side of clamping element 20, and the levers are then compressed together to open the clamping element enlarging opening 25. To close the clamping element the levers are released. In a closed state, the planar levers can remain flipped back, on either side of the clamping element, or they can be flipped forward to the position shown in FIG. 1.

Figure 2A:
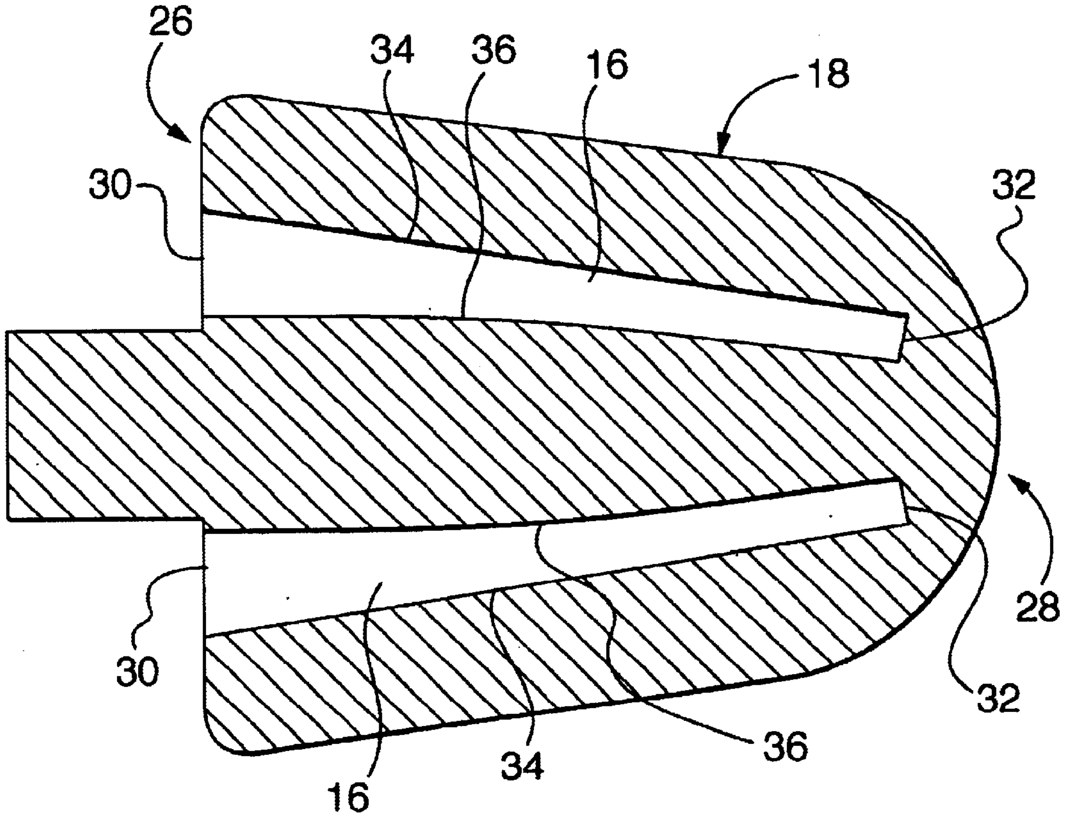
FIG. 2A is a sectional view of a planar member useful in the present invention, taken along line I—I of FIG. 1.

FIG. 2A shows a cross section of planar member 18 taken along line I—I of FIG. 1. Planar member 18 has a proximal edge 26, a distal tip 28 and two cavities 16. Each cavity 16 is elongate, with a proximal opening 30 and a distal closed end 32. In the embodiment shown in FIG. 2A, cavities 16 extend along almost the entire length of the planar member, although a shorter cavity may be used. In the embodiment shown, openings 30 of the two cavities 16 are spaced farther apart from one another than are the distal ends 32 of the two cavities, such that the cavities come closer together upon progression from the proximal edge to the distal tip of planar member 18. The design of the cavities 16 in this manner is not essential. For instance, the cavities may be parallel.

The diameter of cavity 16 is wider at its opening than at its distal end, such that cavity 16 decreases in diameter from opening 30 to distal end 32. The diameter of cavity 16 at its distal end must be sufficiently narrow to prevent the rotational movement of wire member 14 after the wire member described below, is inserted into cavity 16. However, the cross-sectional shape of the cavity at the distal end can be a variety of shapes, including round, oval, square, rectangular and triangular. The diameter of proximal opening 30 must be sufficiently large to allow planar lever 12 to be mounted onto clamping element 20, by drawing the two wire members 14 together and inserting the attachment shafts 22 of the wire members into the attachment cylinders 24 of the clamping element.

In the embodiment shown in FIG. 2A, each cavity 16 has a straight edge 34 and a curved edge 36. Curved edge 36 is curved for about the proximal ⅔ of its length, and the remaining distal ⅓ is straight, so that the approximately distal ⅓ portion of channel 16 is of relatively uniform diameter. The degree of curvature is not uniform along the proximal ⅔ portion of curved edge 36. The dimensions of the channel depend on the thickness and length of the spring wire chosen.

Figure 2B:
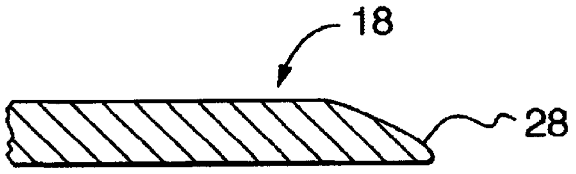
FIG. 2B is a sectional view of a planar member useful in the present invention, taken along line II—II of FIG. 1.

Planar member 18 may be made of any type of moldable material, such as plastic or metal. Additionally, planar member 18 may be molded into a number of shapes—for instance, planar member 18 may be round, oval or square or it may be shaped like an object, with contoured surfaces, such as a flower. Any shape that can accommodate the two cavities 16 for the insertion of wire members 14, and which will function to provide the leverage to open the clip when the levers are pressed together, is intended to be included herein. In one embodiment, one surface of planar member 18 is curved at distal edge 28, as shown in FIG. 2B, which is a cross section of FIG. 1 taken along line II—II. This curvature provides an angled surface for the user of the clip, which may make it easier to press the planar members together to open the clip.

Figure 3A:
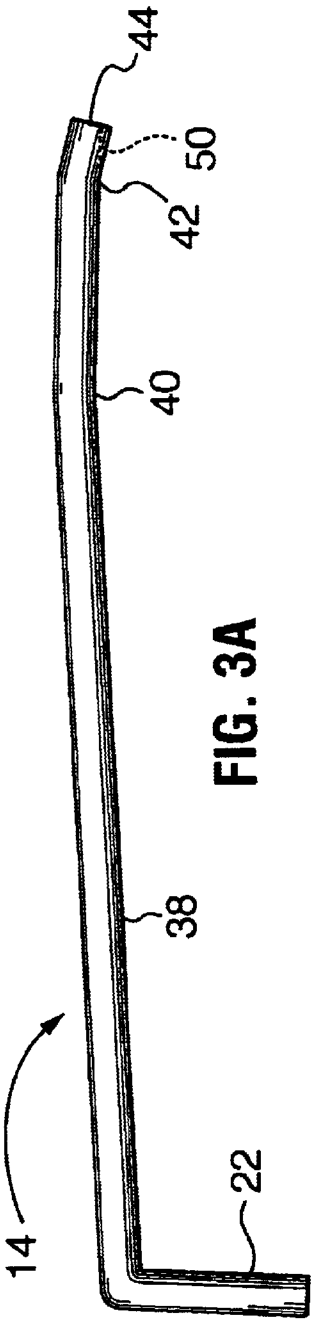
FIG. 3A is a side perspective view of a wire member useful in the present invention.
Figure 3B:
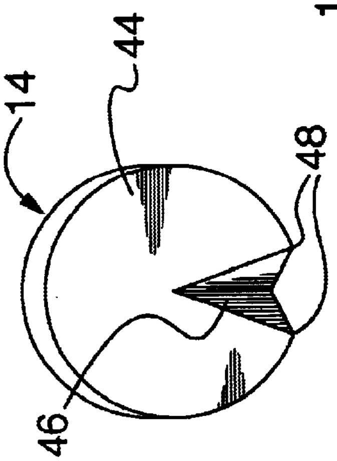
FIG. 3B is an end view of the end of a wire member useful in the present invention.

FIG. 3A shows a side perspective view of an embodiment of wire member 14 of this invention. The wire member has an attachment shaft 22, a longitudinal portion 38, a first bend 40, a second bend 42, and a notched end 44. FIG. 3B depicts an end view of wire member 14 to show end 44. As shown, end 44 of wire member 14 has a notch 46. This notch 46 creates two sharp points 48 on end 44. Notch 46 extends along only the most distal tip of wire member 14, as shown by a line 50 in FIG. 3A, which depicts how the notch is deeper at the distal end and tapers off proximally. Attachment shaft 22 is created by bending the wire member at an approximately 90° angle relative to longitudinal portion 38.

Second bend functions, in one aspect, to position end 44 of wire member 14, such that notch 46 can be carved from end 44, preferably by a machine.

First bend 40 and second bend 42 function, when wire member 14 is inserted into cavity 16, to place the notched end into contact with the end of cavity 16. In such a position, the notched end engages the cavity wall and prevents the rotation of the wire member 14 about its longitudinal axis, as described below. If both wire members 14 are positioned properly upon insertion into cavity 16, and if the wire members do not rotate about their longitudinal axis after insertion, the attachment shafts of the wire members will extend in the same plane so that planar lever 12 can be readily mounted onto clamping element 20 by biasing the wire members towards one another sufficiently to allow attachment shafts 22 to be inserted into attachment cylinders 24.

The bends in longitudinal portion 38 function to position notch 46 such that the notch will restrain rotation of wire member 14 about its longitudinal axis, after the wire member is inserted into cavity 16. As demonstrated in FIG. 4, when wire member 14 is inserted into cavity 16, the decrease in the diameter of cavity 16 causes the wire member to become wedged into the cavity. First bend 40 touches one wall of cavity 16 and end 44 touches the opposite wall of cavity 16 as does wire member 14, at the proximal end of cavity 16 (at arrow 43 in FIG. 4). In this position, points 48 either rest on, or are embedded into the edge of cavity 16, and the rotation of wire member 14 about its longitudinal axis is prevented. As is apparent, different sizes of notches, and different angles of bending in the wire member, depending upon, for example, the thickness or length of the wire member or the dimensions of the cavity, can be used to achieve essentially the same result as is demonstrated in the example herein. Although shown with a first bend and a second bend, wire member 14 need only have one bend to function in this invention.

In the embodiment shown in FIG. 3A, first bend 40 is positioned from end 44 a distance of approximately ¼ of the length of the longitudinal portion. However, a greater or lesser distance could be used. Second bend 42 is positioned from end 44 a distance of approximately 1/16 of the length of the longitudinal portion. However, a greater or lesser distance could be used. Both first bend 40 and second bend 42 are in the same direction and on the same plane. As shown in FIG. 3A, the first and second bend are in the same orientation and plane as attachment shaft 22, however this is not essential.

The amount of deflection in the longitudinal portion of the wire member, and the position of the first bend and second bend on the longitudinal portion will vary depending upon different factors, including the thickness of the wire, the length of the longitudinal portion, the length of channel 16, and the degree of curvature in channel 16. The embodiment shown herein is not intended to be limiting.

Wire member 14 is preferably comprised of high carbon steel wire that is chrome plated. However, other wires, including stainless steel wire or piano wire, may be used in this invention. The type and dimensions of the various parts of the wire member will be governed in part by the dimensions of the clamping element and the planar member that are used in any particular embodiment. For example, a larger clamping element would likely have a larger planar member to provide the torque required to open the clamping element, and the wire member would likely be longer, or thicker than the embodiment described above, in order to provide the required strength and durability. Likewise, smaller clamping elements and planar members would likely have thinner, and shorter, wire members.

Adhesive is added into cavity 16 either before, or as, wire member 14 is inserted into cavity 16. The adhesive functions to bind wire member 14 to planar member 18, once the adhesive sets.

Having thus shown the various elements of the planar levers made according to this method, the method for assembling the planar levers will now be outlined in detail. In order to manufacture a planar lever, two wire members, one planar element and adhesive are required. A clip manufactured according to the method of this invention comprises one clamping element and either one or two planar levers. Preferably the clip is assembled using machines, rather than by hand.

In one method of assembling planar lever 12, a wire member 14 is inserted into each of the two cavities 16 of planar member 18. A selected adhesive that is suitable for attaching plastics to metal, such as epoxy, is inserted into the distal ends of both cavities 16. The adhesive can be added either before the wire member is inserted, or during insertion of the wire member, for instance by placing the adhesive on end 44 of wire member 14 before insertion into cavity 16. Preferably the adhesive does not extend beyond the position of first bend 40 in wire member 14. The wire members are positioned upon insertion such that the tips of the attachment shafts 22, are pointing away from one another and the shafts extend in the same plane.

The attachment shaft 22 of each wire member is then inserted into an attachment cylinder 24 on clamping element 20. Preferably this is done after the adhesive is set. The clamping element has two attachment cylinders on either side of the opening 25. The attachment shafts 22 of the wire members in the planar lever 12 are inserted into the attachment cylinders 24 that are on the same side of opening 25 in clamping element 20.

Figure 4:
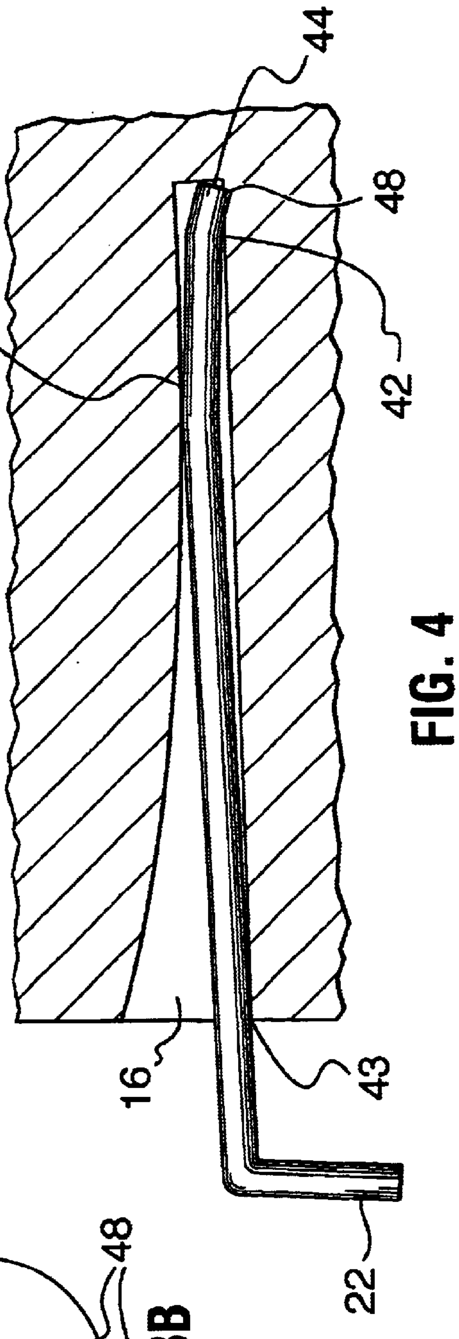
FIG. 4 is a side perspective view of a wire member inserted into the lower channel of FIG. 2A.

In order to insert attachment shafts 22 into attachment cylinders 24, the two wire members 14 in each planar lever 12 are forced closer together momentarily, which allows the tips of the attachment shafts to be positioned in the attachment cylinders. The force is then released and attachment shafts 22 will slide into attachment cylinder 24. Note however, by comparing FIG. 1 and FIG. 4, that after wire elements 14 have been mounted onto clamping element 20, they are tensioned towards one another, as they are closer together in the mounted state (as shown in FIG. 1), than in the unmounted state (as shown in FIG. 4). This additional tension ensures that the wire members remain secured within the attachment cylinder.

Figure 5:
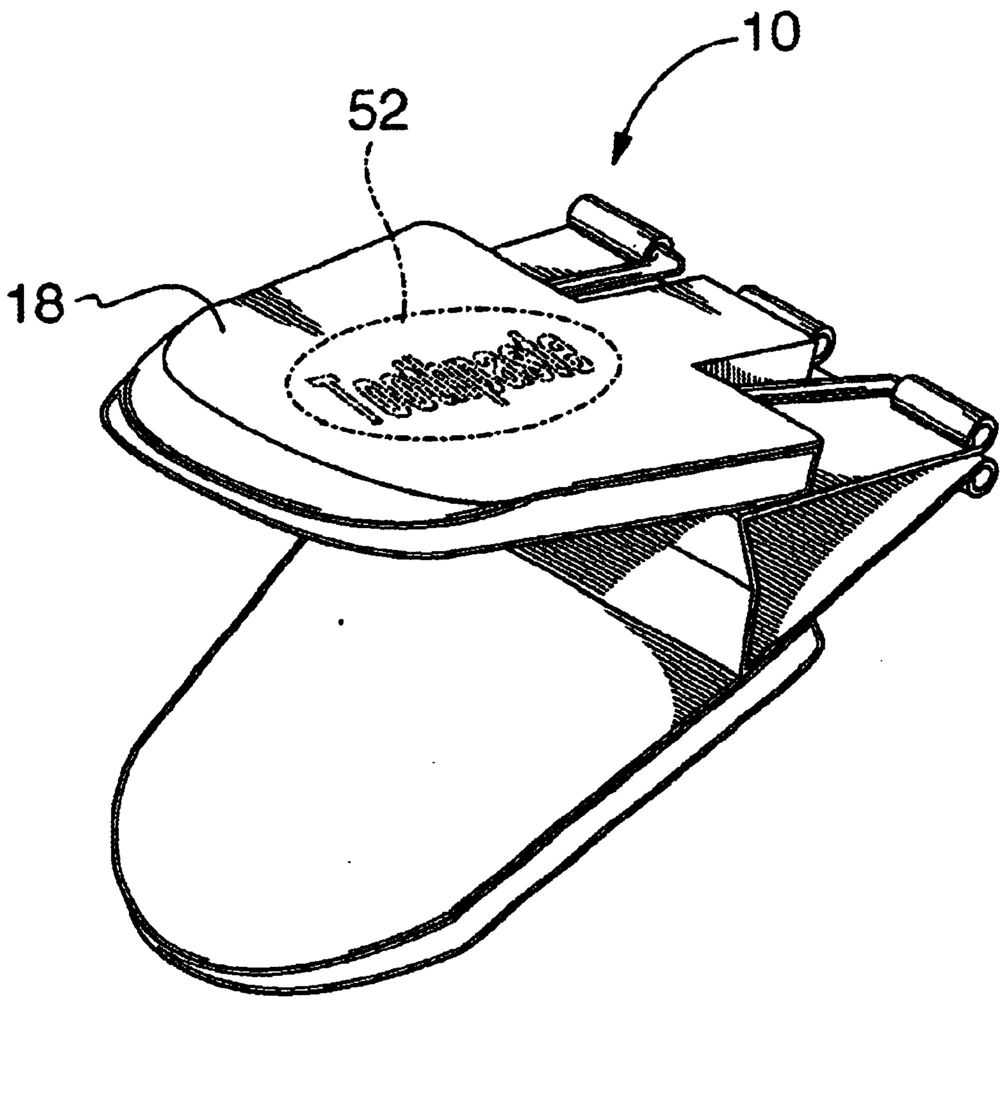
FIG. 5 is a perspective view of a clip with a graphic on one of the planar members.

In another embodiment of this invention shown in FIG. 5, a graphic 52 is placed on one or both of the sides of the planar member 18. Graphic 52 can be any type of visual object, such as an advertisement for a brand of toothpaste, a picture, or a slogan. Preferably, the graphic is placed on the side of the planar member that is displayed when the planar lever is in a flipped-back position, as shown in FIG. 5.

While having shown and described an embodiment of this invention in some detail, it will be understood that this description and illustrations are offered merely by way of example. Alternative methods of assembling the clip of this invention, using the various elements described herein can be devised by those skilled in the art and are intended to be included herein.

I claim:

1. A method for manufacturing a planar lever, said method comprising:

(a) providing two wire members, each wire member comprising:
  (i) an attachment shaft, and
  (ii) a longitudinal portion with a notched end and a bend;
(b) providing one planar member, said planar member defining two cavities, with each said cavity:
  (i) defining a distal portion that hinders the rotation of the wire member about its longitudinal axis after the wire member is inserted into the cavity, and
  (ii) defining a proximal opening that permits the two wire members to be drawn together sufficiently to mount the lever onto a clamping element;
(c) inserting each wire member into a respective cavity until the notched end reaches the distal portion; and
(d) securing each wire member within the cavity with an adhesive.

2. The method of claim 1 wherein the bend is a first bend, and further comprising a second bend in each wire member.

3. The method of claim 1 wherein the planar member is imprinted on at least one side with a graphic.

4. The method of claim 1 wherein the planar member is made of plastic or metal.

5. The method of claim 1 wherein the adhesive is epoxy.

6. A method for manufacturing a clip with one planar lever, said method comprising:

(a) providing a clamping element comprising:
  (i) plated spring material formed into triangular cross-section,
  (ii) an opening along one edge, and
  (iii) two attachment cylinders on each side of the opening; and
(b) inserting each attachment shaft of a planar lever manufactured according to the method of claim 1 into a respective attachment cylinder located on one side of the opening.

7. A method for manufacturing a clip with two planar levers, said method comprising:

(a) providing a clamping element comprising:
  (i) plated spring material formed into triangular cross-section,
  (ii) an opening along one edge, and
  (iii) two attachment cylinders on each side of the opening; and
(b) inserting each attachment shaft of a planar lever manufactured according to the method of claim 1 into a respective attachment cylinder located on one side of the opening, and
(c) inserting each attachment shaft of a second planar lever manufactured according to the method of claim 1, into a respective attachment under on the other side of the opening.

* * * * *